(12) United States Patent
Carter et al.

(10) Patent No.: US 8,702,349 B2
(45) Date of Patent: Apr. 22, 2014

(54) PIPE BURSTING APPARATUS

(75) Inventors: Robert Ward Carter, Alameda, CA (US); Robert Ding, Walnut Creek, CA (US)

(73) Assignee: Tric Tools, Inc., Alameda, CA (US)

(*) Notice: Subject to any disclaimer, the term of this patent is extended or adjusted under 35 U.S.C. 154(b) by 0 days.

(21) Appl. No.: 13/310,643

(22) Filed: Dec. 2, 2011

(65) Prior Publication Data

US 2012/0170980 A1 Jul. 5, 2012

Related U.S. Application Data (60) Provisional application No. 61/458,981, filed on Dec. 3, 2010.

(51) Int. Cl.
*F16L 55/18* (2006.01)

(52) U.S. Cl.
USPC ............... 405/184.1; 405/184.3; 405/184; 254/29 R (58) Field of Classification Search
USPC ............ 405/183.5, 184.1, 184.3; 254/134.6
See application file for complete search history.

(56) References Cited

U.S. PATENT DOCUMENTS

| | | | | |
|---|---|---|---|---|
| 3,759,146 | A * | 9/1973 | Brotherton | 92/13.6 |
| 3,834,668 | A * | 9/1974 | Casey | 254/29 R |
| 5,078,546 | A | 1/1992 | Fisk et al. | |
| 5,211,509 | A * | 5/1993 | Roessler | 405/184 |
| 5,439,320 | A * | 8/1995 | Abrams | 405/184.3 |
| 6,305,880 | B1 | 10/2001 | Carter | |
| 6,357,967 | B1 | 3/2002 | Putnam | |
| 7,624,817 | B2 * | 12/2009 | Putnam | 175/53 |
| 2002/0081154 | A1 | 6/2002 | Herrick et al. | |
| 2003/0147700 | A1 | 8/2003 | Carter et al. | |
| 2004/0074385 | A1 | 4/2004 | Hennemann et al. | |
| 2004/0265067 | A1 * | 12/2004 | Putnam | 405/184.3 |
| 2005/0042036 | A1 | 2/2005 | Carter et al. | |
| 2006/0056919 | A1 * | 3/2006 | Tjader | 405/184.3 |
| 2006/0088384 | A1 * | 4/2006 | Putnam | 405/184.1 |
| 2006/0099035 | A1 * | 5/2006 | Wentworth | 405/184.1 |
| 2007/0048090 | A1 * | 3/2007 | Wentworth et al. | 405/184.1 |
| 2007/0140793 | A1 * | 6/2007 | Hau | 405/184.3 |
| 2007/0253781 | A1 | 11/2007 | Sewell | |
| 2010/0067988 | A1 * | 3/2010 | Tjader | 405/184.3 |
| 2011/0188943 | A1 * | 8/2011 | Wentworth et al. | 405/184.3 |

OTHER PUBLICATIONS

Miller Pipeline Corporation, Expandit Product Brochure, 1994, 8 pages.

* cited by examiner

*Primary Examiner* — Benjamin Fiorello
(74) *Attorney, Agent, or Firm* — Donald L. Bartels; Bartels Law Group (57) ABSTRACT

Apparatus for replacing underground pipe is described, including a resistance plate from which a pair of hydraulic cylinders extend perpendicularly in parallel with each other. The cylinders operate cyclically with a pulling bridge having a cable gripper to provide a sequence of pulling strokes to a cable pulling a mole. The mole pulls a replacement pipe behind it through the old pipe, which has been burst, slit, or otherwise expanded by the mole. The resistance plate is provided with a slot, and the cylinders are positions such as to allow the mode to be pulled substantially completely into the apparatus. A holding bridge is releasably mounted spanning the slot in the reaction plate to position a second cable gripper for holding the cable on return stroke of the pulling bridge. The holding bridge may be removed at the end of the pulling operation to accommodate the mole.

4 Claims, 5 Drawing Sheets

PIPE BURSTING APPARATUS

CROSS REFERENCE TO RELATED APPLICATION

This application claims the benefit of U.S. Provisional Application No. 61/458,981 filed Dec. 3, 2010, the entirety of which is hereby incorporated by reference.

FIELD OF INVENTION

This invention relates to the replacement of underground pipe by the use of so called pipe bursting. More particularly, the invention relates to an improved apparatus for replacing underground pipe by bursting or slitting the pipe in situ while pulling a replacement pipe into substantially the same position.

BACKGROUND

Pipe bursting is a known technique for replacing underground pipe, such as sewer, water and gas lines, without having to dig a trench to remove the old pipe and position a new one. In pipe bursting, a bursting head or mole is pushed or pulled through the old pipe to burst or slit the old pipe while, usually concurrently, feeding a replacement pipe into position. The replacement pipe is typically flexible and is preferably high density polyethylene (HDPE).

Initially, most pipe bursting apparatus employed winches, pulleys, and other relatively large components in order to develop the necessary forces. Such equipment also typically required relatively large excavations at either end of the section of pipe being replaced in order to position the equipment properly.

Later, however, advancements in design, an example of which is shown and described in U.S. Pat. No. 6,305,880, resulted in smaller, lighter weight equipment. Smaller excavations were required at either end of the pipe segment being replaced, and the equipment could be manually positioned for use. This opened the way for pipe bursting to be used for smaller applications, such as the replacement of residential lateral sewer and water lines.

Still, apparatus for pipe bursting in smaller applications remains relatively large, heavy, and complex. As a consequence, there are physical difficulties in the handling of such equipment, and significant costs in materials and manufacturing. Also, because of the high forces required in the pulling process, high pressure hydraulics were typically employed, further adding to the manufacturing cost.

Accordingly, there is a need for a pipe bursting apparatus which is low in cost and complexity, easier to handle and set up, and capable of operating with lower pressure hydraulics.

SUMMARY OF THE INVENTION

The foregoing needs are met by the apparatus of the invention. Several features are employed which act in a novel combination to provide a robust apparatus of relatively light weight and low cost, which is easy to use, and is capable of operating at relatively low hydraulic pressures. In particular, the apparatus of the invention comprises a pair of hydraulic cylinders, each having a cylinder rod projecting from opposite ends of the cylinder. The cylinders are mounted substantially parallel with each other to extend substantially perpendicularly from a reaction plate, with the adjacent projecting ends of the cylinder rods being secured, respectively, in mating recesses in the reaction plate. At their opposite ends, the cylinder rods are similarly secured, each in a respective mating recess in a pulling bridge. The pulling bridge is equipped with a cable gripper which secures the cable during a pulling stroke and which allows the cable to slide through it during the recovery stroke. The reaction plate is formed with a wide slot therein through which the cable passes during the pulling process and through which the cable may be passed sideways during set up. The cylinders are positioned asymmetrically with respect to the slot so as to maximize the lateral distance between them. A holding bridge is also provided spanning the slot in the reaction plate, and is removably secured to the reaction plate. The holding bridge supports a second cable gripper aligned with the cable to hold the cable in place during the recovery stroke. At the end of the pulling process, the holding bridge may be removed to enable the mole to be pulled through the slot in the resistance plate far enough to expose the replacement pipe. This eliminates the need for further excavation to expose the replacement pipe.

DETAILED DESCRIPTION OF THE INVENTION

Figures 1, 1A:
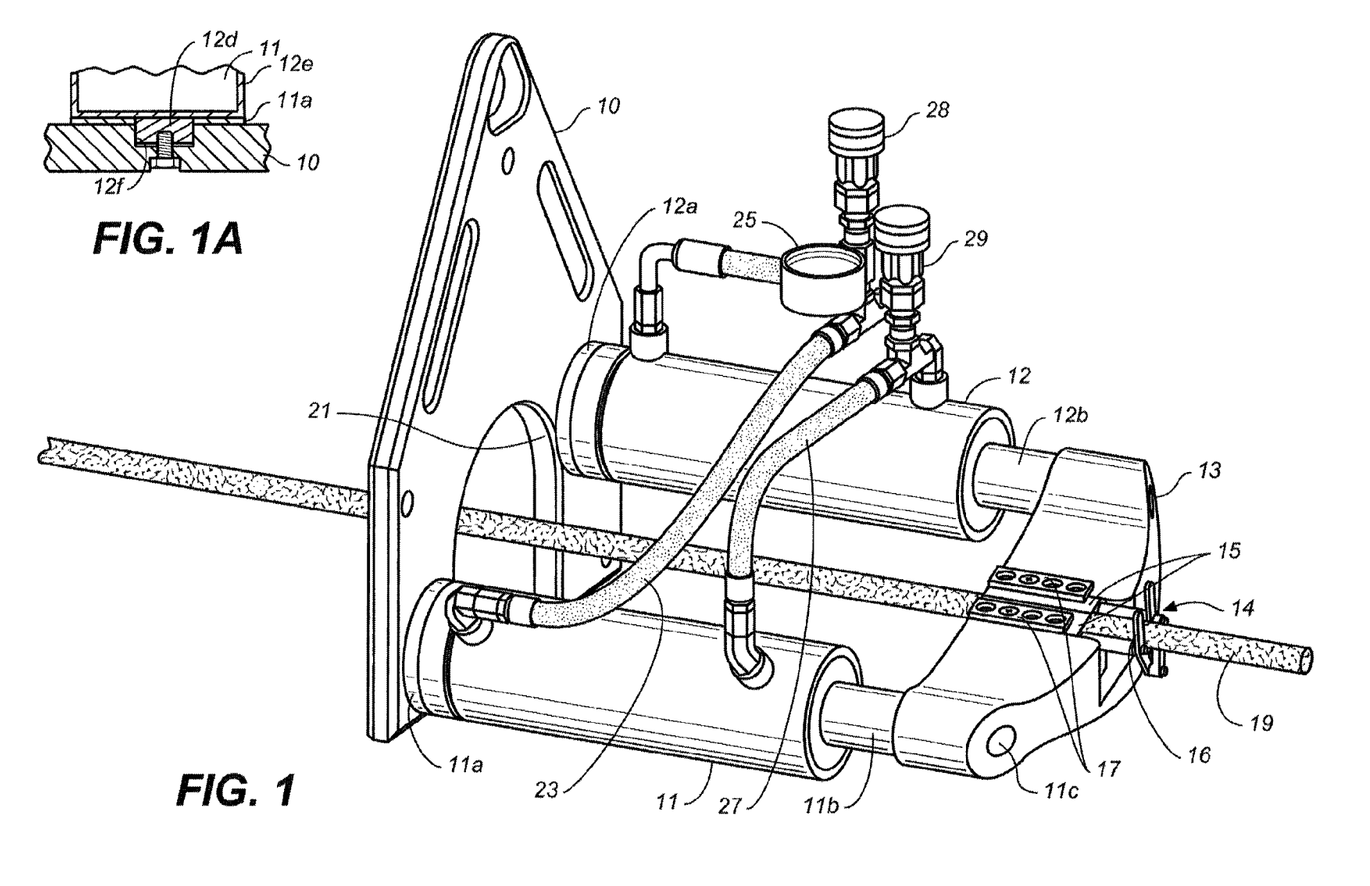
FIG. 1 is a perspective view of the apparatus of the invention, showing the pulling cable in place, and not showing the holding bridge.
FIG. 1A is a cross-sectional view of a portion of the apparatus of the invention.
Figure 2:
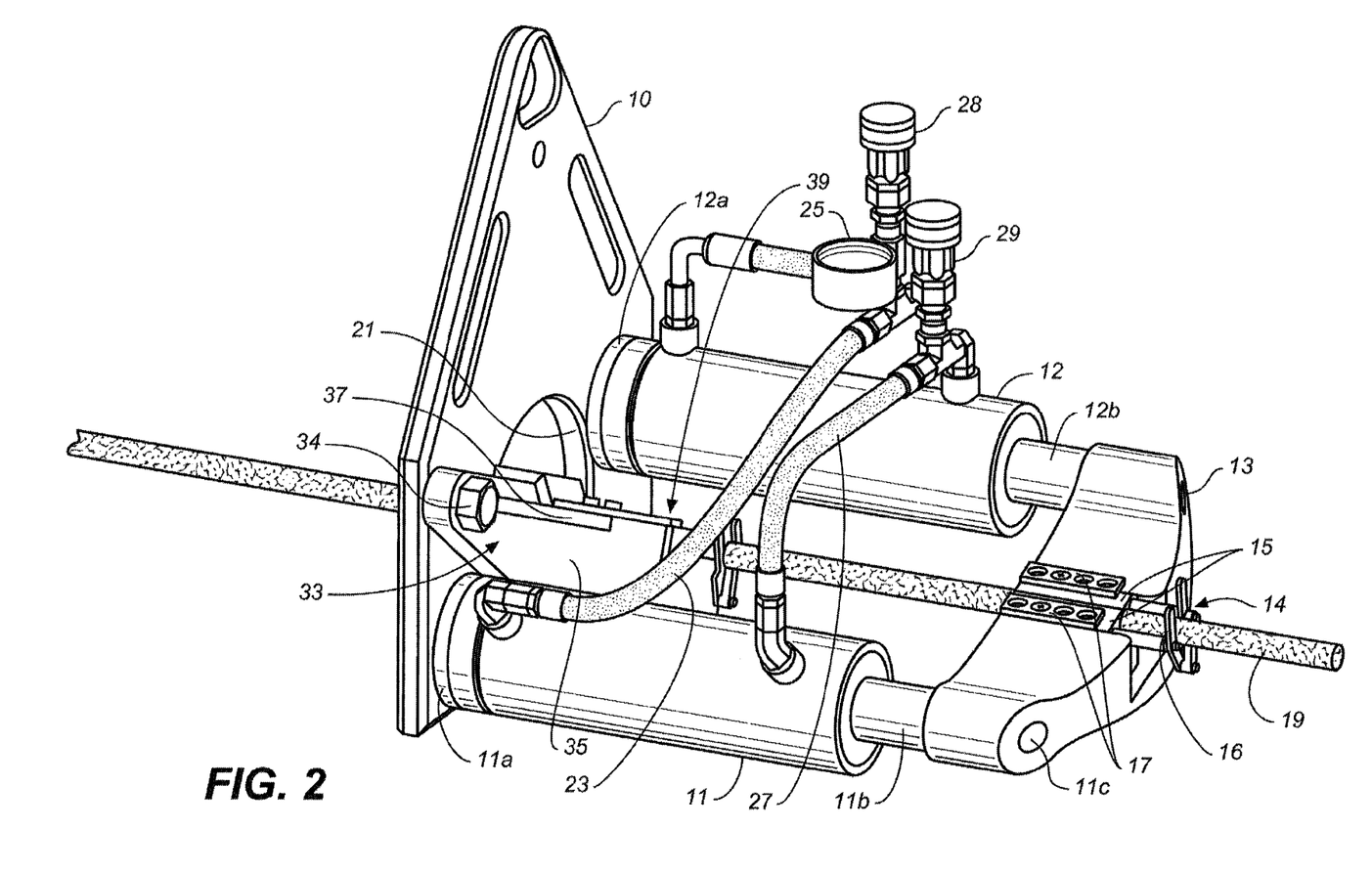
FIG. 2 is a perspective view of the apparatus of the invention showing the pulling cable and the holding bridge in place.

Referring to FIGS. 1 and 2, a preferred form of the apparatus of the invention is depicted. A reaction plate 10, also referred to as a resistance plate, preferably 18 to 24 inches wide, roughly the same height, and one to two inches thick is shown. It is also preferred that the reaction plate 10 be steel or comparable material. The reaction plate is positioned in a pit at one end of the segment of pipe to be replaced to bear against the wall of the pit from which the segment typically emerges. Timbers or equivalent materials may be placed between the reaction plate and the pit wall as desired to distribute the load. In any case, the reaction plate supports the other components of the apparatus as will be described. As shown, the reaction plate may be provided with openings, not numbered, for ease of handling and reduction of weight.

The reaction plate 10 is also provided with a further opening or slot 21 so as to allow a pulling cable 19 to pass through the reaction plate. Because the slot 21 opens through one side of the reaction plate 10, the reaction plate can be placed in position without having to thread the cable 19 through the slot 21. The slot 21 is also formed with sufficient width so as to allow a bursting head, also referred to as a mole, to be pulled into or even through the reaction plate.

For providing the force to pull the cable, a pair of hydraulic cylinders 11 and 12 is mounted to the reaction plate in substantially parallel relation to each other. Preferably, the cylinders are so called low pressure cylinders, typically having a maximum design pressure of 5000 psi or less. Each cylinder has a cylinder rod, 11b and 12b respectively, which projects from one end of the cylinder. Not visible in FIGS. 1 and 2, but shown in FIG. 1A, is a mounting rod, described below, which projects from each of the cylinders in axial alignment with the cylinder rods. In order to mount the cylinders to the resistance plate, a recess is formed in the plate to mate with and receive the proximal end of each of the mounting rods. This is shown in FIG. 1A wherein the mounting rods 12d are welded to a cup 12e fitted over the ends of the cylinders.

A threaded axial opening is provided in the ends of the cylinder rods 11b and 12b and the mounting rods 12d for securing the end in place in the recess 12f with a bolt. Washers, 11a and 12a, may also be used to help secure the cylinders 11 and 12 to the reaction plate. A cross-sectional view of the mounting rod 11b connection to the reaction plate is depicted in FIG. 1A. It is to be understood that the mounting and cylinder rod connections at all ends are substantially as depicted therein.

The ends of the cylinder rods distal to the reaction plate are secured to a pulling bridge 13. The pulling bridge 13 is preferably steel or similar material and is designed to transmit the force generated by the hydraulic cylinders 11 and 12 to the cable 19. As was the case with the reaction plate, the pulling bridge 13 is provided with a pair of recesses for mating with and receiving an end of one of the cylinder rods 11b and 12b. As also was the case with the reaction plate, the cylinder rods are secured in place by a bolt 11c extending through the pulling bridge 13 into an axial threaded opening in the rod.

For the purpose of gripping the cable, the pulling bridge is provided with a gripper mechanism 14. The gripper mechanism 14 may be of any suitable design for firmly gripping the cable 19 during the pulling stroke, and releasing the cable during the recovery stroke. Mechanisms for this purpose may be active or passive, and are well known to those skilled in the art. One example of such a mechanism is shown and described in U.S. Pat. No. 6,305,880. In the embodiment illustrated herein, the illustrated gripper mechanism includes a pair of elongated chuck fingers or collets 15 held in place with cover plates 17. Inwardly facing teeth on the fingers are spring biased by a spring loader 16 so that the cable is secured during the pulling stroke but released during the return cycle when the pulling bridge is moved in the opposite direction.

The hydraulic connections for the illustrated embodiment are shown in the drawings. During the pulling stroke, pressure is supplied to the cylinders via the supply hose 23 to the internal piston (not shown) of the cylinders 11 and 12 to move the piston and hence the pulling bridge away from the resistance plate 10. This pulls the cable and hence the mole through the old pipe, bursting and/or slitting it and drawing the new pipe into place. A pressure indicator is provided also, shown at 25. In order to return the pulling bridge and cylinder to a position for initiating the next pulling stroke, a supply hose 27 is provided. At the end of the pulling stroke, pressure is released via the supply hose 23 and increased via the supply hose 27. Connectors 28 and 29 are provided for connection to a pump or similar source of hydraulic pressure. As an alternative, the return stroke could be accomplished by a spring mechanism or the like.

Also provided in the preferred embodiment is a holding bridge 33, not shown in FIG. 1. As shown, the holding bridge is comprised of a bottom plate 34, which is removably bolted to the resistance plate 10 so that the holding bridge 33 spans the slot 21. The holding bridge 33 also includes a cable guide block 35 extending from the bottom plate and formed with two supporting gussets 37. The cable guide block has a central cable guide slot therein with outwardly beveled ends to assist in keeping the cable aligned, as is known in the art. Also supported in the guide slot is a cable holding gripper assembly 39. The gripper assembly 39 may, as was the case with the gripper assembly 14, be of any suitable design to hold the cable in place during the return stroke, that is, when the gripper 14 has released the cable and the pulling bridge 13 is returning to position for another pulling stroke.

It should be noted at this point that the pulling bridge 13 and the holding bridge 33 are preferably formed to be symmetrical as to there shape and position. In this way, the orientation of either bridge may be reversed so as to accommodate the user's preferences. Also, because the holding bridge may be completely removed from the assembly, the mole may be fully withdrawn from the pipe opening and into the assembly. This facilitates disconnection of the mole and eliminates the need for further excavation in order to gain access to the end of the new pipe.

Once the mole is pulled through the old pipe, with the replacement pipe pulled into place behind it, it becomes necessary to extract the mole and to gain access to the replacement pipe to complete the pipe connections. In prior art systems, this frequently required disconnection of the cable from the mole, removal of the pulling apparatus and the mole from the excavation, and further digging in the excavation to expose the end of the replacement pipe.

Figure 3:
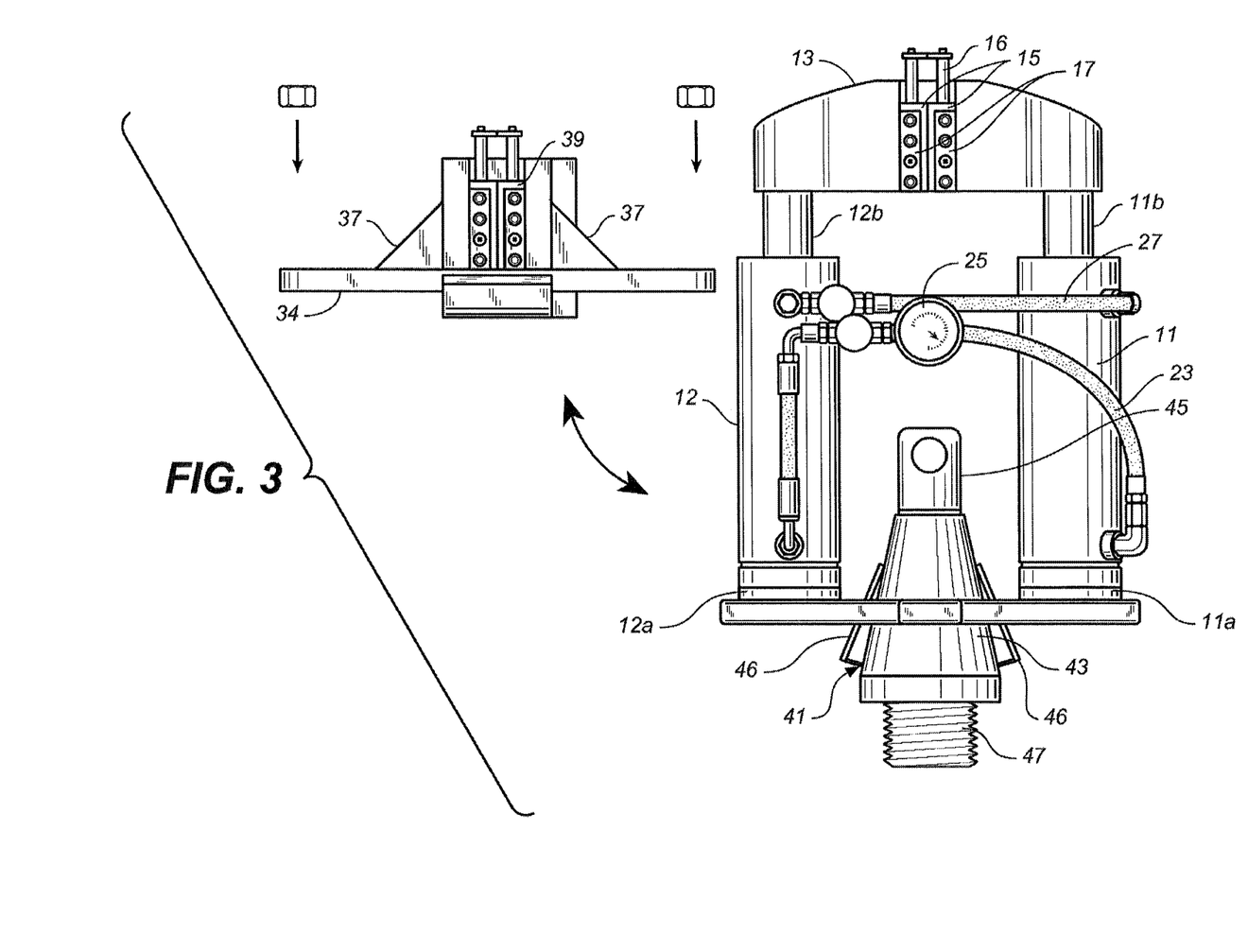
FIGS. 3 through 5 are exploded views of the apparatus of the invention showing the sequence of the mole emerging and passing through the slot in the resistance plate.
Figure 4:
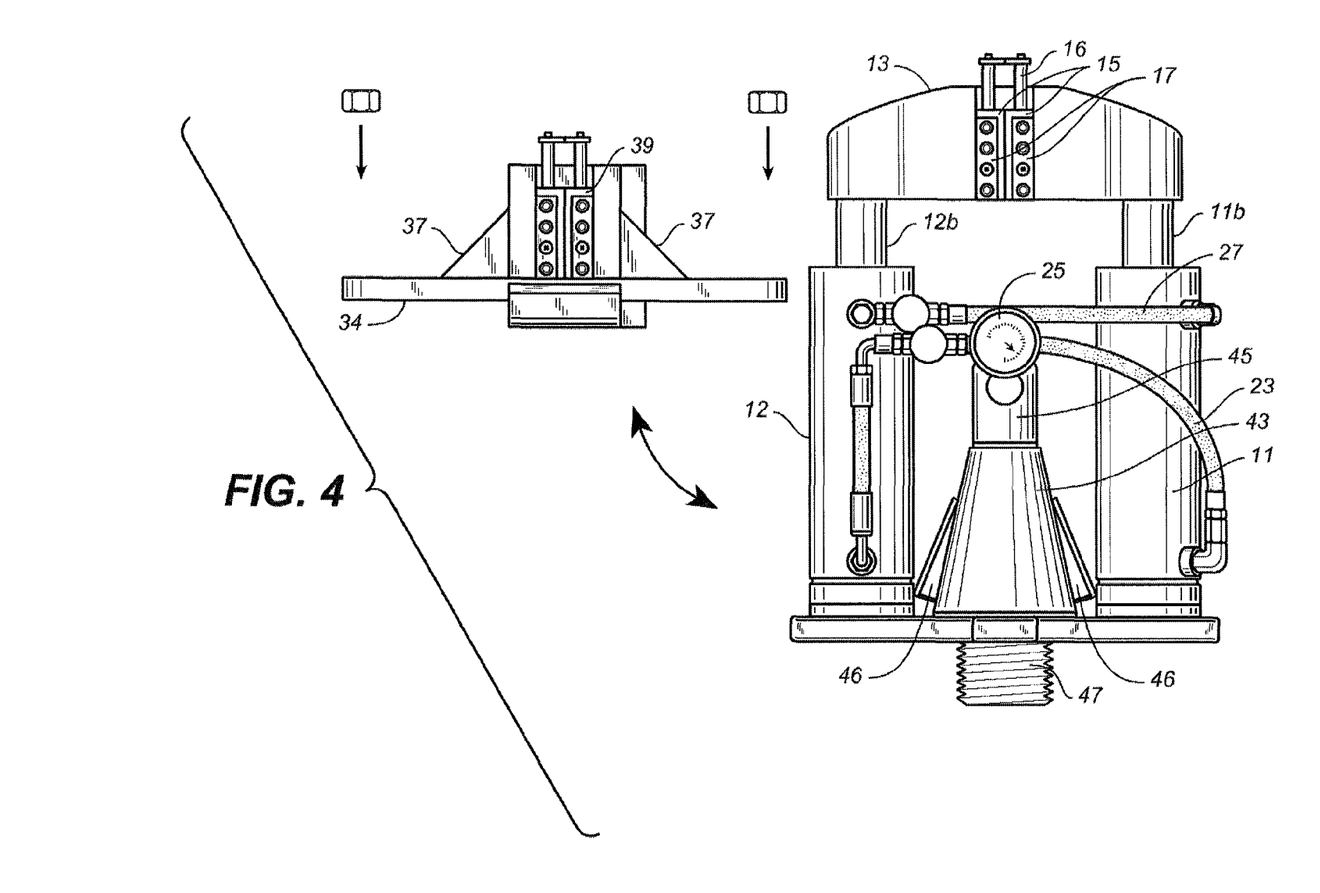
Figure 5:
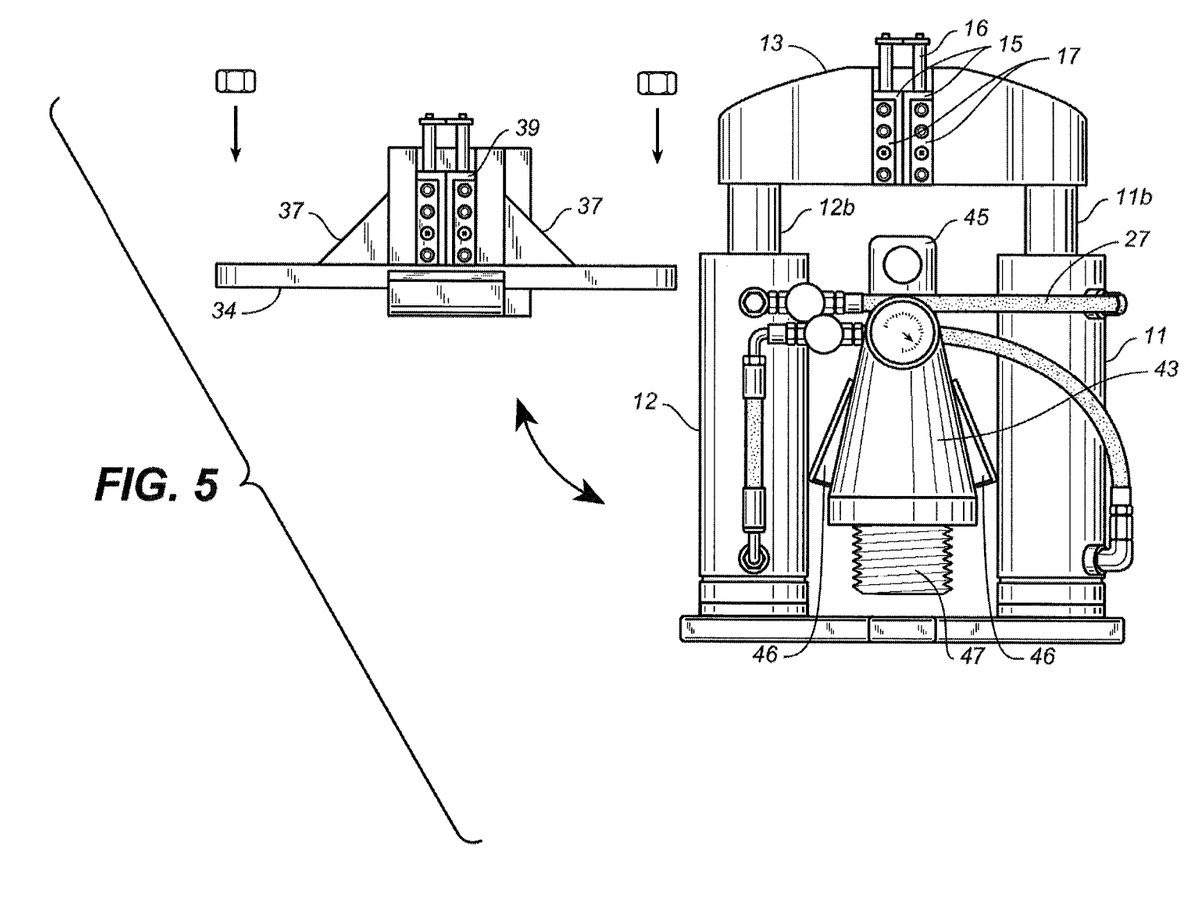

With the apparatus of the present invention, such steps become unnecessary. The sequence at the end of the pull is illustrated in FIGS. 3 through 5. A mole 41 is illustrated in FIG. 3 just as it is pulled out of the old pipe (not shown) and into the apparatus of the invention. It is to be understood that the apparatus is positioned in an excavated pit at the end of the segment of pipe to be replaced. The mole may be of any configuration known in the pipe replacement industry, so long as its size permits it to be drawn through the slot 21 of the resistance plate 10. Typically, the mole has a frustoconical surface 43 for bursting or expanding the old pipe and may have slitter blades 46 to further assist in the bursting or slitting process, as is known in the art. A connector flange 45 connects to the pulling cable, not shown. A threaded connector or equivalent 47 extends from the back of the mole for connecting to the replacement pipe, also not shown.

In FIG. 4, the mole is pulled further into the apparatus. It should be noted that the holding bridge is removed during these final sequences to permit passage of the mole into the apparatus. In the final position shown in FIG. 5, the mole is fully withdrawn from the old pipe and into the apparatus. The end of the replacement pipe is thereby exposed for easy access, and the apparatus and the mole may be easily removed from the pit.

Various advantages result from the foregoing described apparatus. Because the pulling bridge and the resistance plate are directly connected to the piston cylinder rods, substantial rigidity is achieved with minimal weight. By using a removable holding bridge, through the mounting to the resistance plate combined with an openable cable path in the gripper assembly, the mole may be drawn completely into the apparatus, simplifying procedures at the conclusion of the pulling process. Asymetrical spacing of the cylinders maximizes the usable cylinder space. This enables the use of higher piston surface area cylinders so that adequate pulling forces can be achieved with lower pressure hydraulics. Finally, the use of symmetrical bridges enables the bridges positions to be "flipped" for added versatility and convenience to the operator.

Various modifications of the invention will become apparent to those skilled in the art from the foregoing drawings and accompanying drawings. Such modifications are intended to fall within the scope of the accompanying claims.

What is claimed is:

1. Apparatus for replacing underground pipe with a replacement pipe, comprising:
   a resistance plate for positioning against a wall through which a cable protrudes, the opposite end of the cable being connected to a mole having the replacement pipe connected thereto, said resistance plate having a slot therein of a size sufficient to allow passage of the mole therethrough;

a pair of hydraulic cylinders positioned on opposite sides of said slot extending substantially parallel to each other and substantially perpendicular to said resistance plate to define a space into which the mole may be drawn by said cable;

a pulling bridge secured to each of said cylinders at the end thereof opposite said resistance plate, said pulling bridge being reciprocally movable by operation of said cylinders in a pulling stroke and a recovery stroke, said pulling bridge having a cable gripper assembly thereon for griping the cable during the pulling stroke and releasing the cable during the recovery stroke; and a holding bridge releaseably mounted to said resistance plate spanning said slot, said holding bridge having a gripper assembly thereon for releasing the cable during the pulling stroke and gripping the cable during the recovery stroke, whereby said holding bridge may be removed to allow said mole to be drawn through said resistance plate into the space defined by said cylinders to facilitate detachment of the mole from the replacement pipe being pulled by the mole.

2. The apparatus of claim 1 wherein said pulling bridge and said holding bridge are mounted with their respective gripper assemblies aligned to define a cable pulling axis substantially perpendicular to said resistance plate, said pulling bridge being configured so that said pulling bridge may be inverted with respect to said cable pulling axis with said gripper assemblies remaining substantially aligned.

3. The apparatus of claim 1 wherein each of said cylinders has a cylinder rod and a mounting rod projecting in substantial alignment with the axis of said cylinder from opposite ends of said cylinder, said resistance plate and said pulling bridge having recesses therein substantially aligned with the axes of said cylinders for receiving said mounting rods and said cylinder rods respectively.

4. The apparatus of claim 1 wherein said cylinders are positioned on opposite sides of said slot in asymmetrical relationship thereto.

* * * * *

(12) EX PARTE REEXAMINATION CERTIFICATE (10509th)
United States Patent
Carter et al.

(10) Number: US 8,702,349 C1
(45) Certificate Issued: Feb. 25, 2015

(54) PIPE BURSTING APPARATUS

(75) Inventors: Robert Ward Carter, Alameda, CA (US); Robert Ding, Walnut Creek, CA (US)

(73) Assignee: Tric Tools, Inc., Alameda, CA (US)

Reexamination Request:
No. 90/013,311, Aug. 5, 2014

Reexamination Certificate for:
Patent No.: 8,702,349
Issued: Apr. 22, 2014
Appl. No.: 13/310,643
Filed: Dec. 2, 2011

Related U.S. Application Data

(60) Provisional application No. 61/458,981, filed on Dec. 3, 2010.

(51) Int. Cl.
*F16L 55/18* (2006.01)
*F16L 55/165* (2006.01)
*E21B 7/20* (2006.01)

(52) U.S. Cl.
CPC .............. *F16L 55/1658* (2013.01); *E21B 7/205* (2013.01)
USPC ........................................................ 405/184.1

(58) Field of Classification Search
None
See application file for complete search history.

(56) References Cited

To view the complete listing of prior art documents cited during the proceeding for Reexamination Control Number 90/013,311, please refer to the USPTO's public Patent Application Information Retrieval (PAIR) system under the Display References tab.

*Primary Examiner* — Aaron J Lewis (57) ABSTRACT

Apparatus for replacing underground pipe is described, including a resistance plate from which a pair of hydraulic cylinders extend perpendicularly in parallel with each other. The cylinders operate cyclically with a pulling bridge having a cable gripper to provide a sequence of pulling strokes to a cable pulling a mole. The mole pulls a replacement pipe behind it through the old pipe, which has been burst, slit, or otherwise expanded by the mole. The resistance plate is provided with a slot, and the cylinders are positions such as to allow the mode to be pulled substantially completely into the apparatus. A holding bridge is releasably mounted spanning the slot in the reaction plate to position a second cable gripper for holding the cable on return stroke of the pulling bridge. The holding bridge may be removed at the end of the pulling operation to accommodate the mole.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-4 is confirmed.

* * * * *